United States Patent

[11] 3,548,892

| [72] | Inventor | Edwin G. Olson<br>Newark, Del. |
|---|---|---|
| [21] | Appl. No. | 682,936 |
| [22] | Filed | Nov. 14, 1967 |
| [45] | Patented | Dec. 22, 1970 |
| [73] | Assignee | E. I. du Pont de Nemours and Company<br>Wilmington, Del.<br>a corporation of Delaware |

[54] METHOD FOR INCREASING THE STORAGE BULK-DENSITY OF CELLULAR POLYMERIC FIBERS
9 Claims, 5 Drawing Figs.

[52] U.S. Cl................................................. 141/11,
141/12; 302/14
[51] Int. Cl...................................................... B65b 1/04,
B65b 3/04

[50] Field of Search........................................... 141/11, 12,
69, 70, 71, 73, 80; 53/(Inquired); 302/(Inquired),
14; 100/(Inquired), 73, 74

[56] References Cited
FOREIGN PATENTS
32,725 5/1934 Netherlands................. 141/71

Primary Examiner—Houston S. Bell, Jr.
Attorney—Don M. Kerr

ABSTRACT: The bulk-density in storage of low-intensity staple-length cellular polymeric strands is increased by maintaining the surfaces of the strands wet with a liquid. Typically, the volume occupied by the wet strands is one-half or less than that occupied by the same strands when dry.

INVENTOR
EDWIN G. OLSON

BY
ATTORNEY

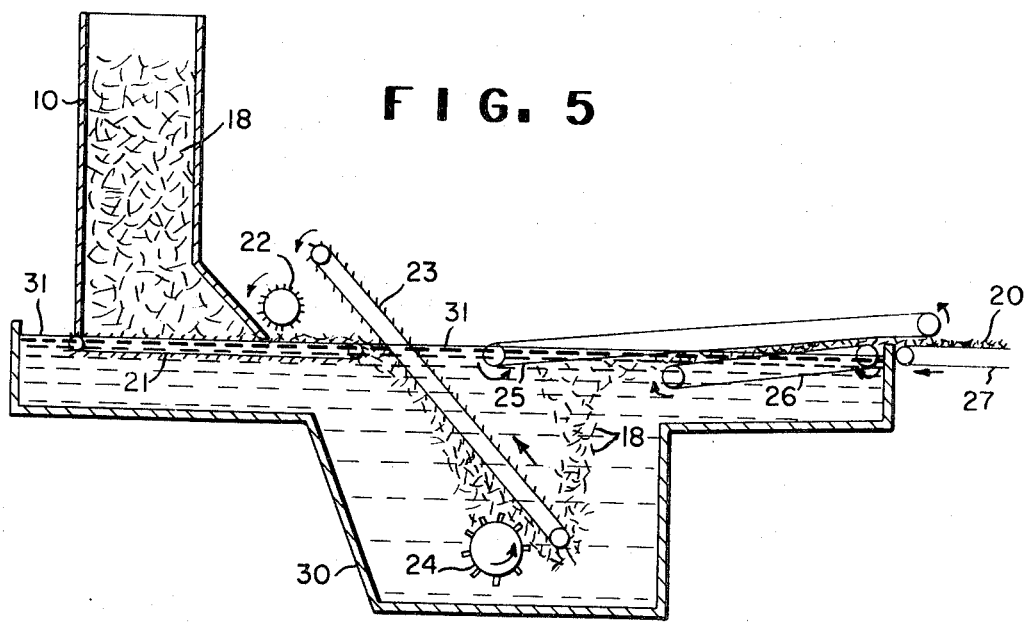

METHOD FOR INCREASING THE STORAGE BULK-DENSITY OF CELLULAR POLYMERIC FIBERS

BACKGROUND

This invention relates to a method for increasing the bulk density in storage of low-density cellular polymeric strands.

It is known to use strands comprising expanded cellular polymeric material in cushioning or heat-insulating applications. An upholstered article comprising such strands is disclosed by Pollack in U.S. Pat. No. 3,059,251, issued Oct. 23, 1962. Frequently the cellular strands are curled, bent, curved, or twisted, elongated, individual pieces of cellular polymeric foam. These may be cut from continuously extruded foamed filaments or from massively foamed blocks and plates (the latter disclosed by Tobari in U.S. Pat. No. 3,080,580 issued Mar. 12, 1963). Also, it is possible to extrude continuous dense polymeric filaments containing a blowing agent, to cut the filaments into individual pieces, and then to foam the individual pieces by, for example, a heating step. The formation of such low-density, cellular, polymeric strands is disclosed by Oswald et al. in U.S. Pat. No. 3,147,321, issued Sept. 1, 1964, and by Paulson in U.S. Pat. No. 3,165,303, issued Jan. 12, 1965. Likewise, the use of a tangled mass of these strands for cushioning of delicate items in packages is disclosed by Zweigle et al. in U.S. Pat. No. 3,066,382, issued Dec. 4, 1962.

Intermediate to the formation of the low-density cellular strands and to their actual use as cushioning or insulating materials, it is frequently either desirable or necessary to store them in a hopper, or the like, for later removal and use. The low density and consequent low weight of these strands leads to inefficient packing in storage, i.e., to very low bulk densities. Therefore, the storage containers must be very large if significant weight of the cellular strands is to be retained. Removal of such strands from storage at a uniform rate is complicated by their known high surface friction properties and their propensity, in general, to develop static charge. As a result, the strands tend to agglomerate in clumps, and their rate of removal becomes erratic. Removal from the bottom of a storage container is frequently interrupted completely by bridging of the entangled low-weight mass at a point above the outlet.

SUMMARY OF THE INVENTION

This invention provides a convenient and inexpensive method for substantially increasing the bulk-density of low-density cellular strands in bulk storage. It further provides for more efficient removal of the strands from storage by decreasing the surface friction of the strands and by eliminating the buildup of static electricity.

In the process according to this invention, low-density cellular polymeric strands are collected within a storage container and maintained wet with a liquid, preferably water, which is both inert to and a nonsolvent for the strands.

BRIEF DESCRIPTION OF THE DRAWINGS

FIG. 5 represents schematically and in cross-sectional elevation one method for removing water-wet cellular filaments from storage.

DESCRIPTION OF THE PREFERRED EMBODIMENTS

Figure 1:
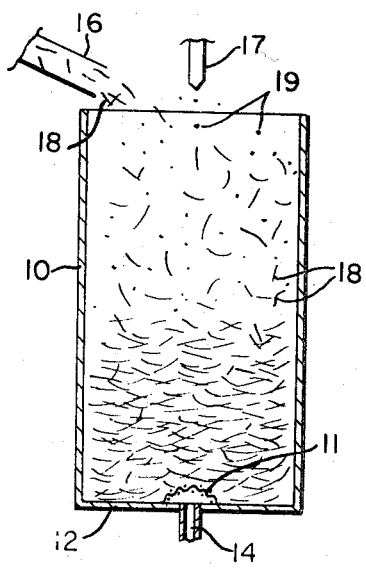
FIG. 1 shows schematically and in cross section a preferred arrangement of apparatus suitable to the practice of this invention.
Figure 2:
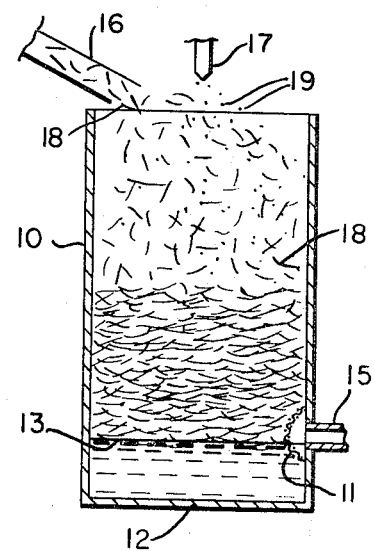
FIG. 2 is as shown in FIG. 1 except for the location of the drain for withdrawing liquid.

With reference now to the drawing, there is provided a storage container 10 which, as shown in this embodiment, is generally cylindrical or rectangular in cross section, has an open top, and has a bottom 12 which can be completely closed (FIG. 2) or can be provided with openings for drainage of accumulating liquid or for other auxiliary functions. Drain 14 is representative of such openings, which ordinarily are covered by a screen 11, or the like, to prevent entrance of the strands 18. In FIG. 2, a drain 15 is provided above the bottom 12 and through the wall of container 10. In FIGS. 1 and 2 are shown a duct 16 delivering low-density cellular polymeric strands 18 into container 10 and a nozzle 17 delivering a spray 19 of liquid. (Since water is the most readily available, inexpensive, and easily handled liquid, it is referred to as the liquid hereinafter. In those rare instances in which water is reactive toward or a solvent for the strands, it is understood that a different liquid can be substituted). The delivery rate of water is adjusted to provide a thin film of water on surfaces of the strands 18 but not to build up at the bottom faster than it can be removed through drains 14 or 15 or to completely fill all interstrand spaces at any level above the bottom of the accumulation of strands 18. In the practice of this invention, water-wetting can be continuous or intermittent during filling of the container 10 with strands 18. Ordinarily, when container 10 is full of strands 18, the water is turned off. During prolonged storage, however, it may be necessary to occasionally add more water, or the filled container can be continuously wetted, as is well understood.

In FIG. 2 is represented the case where drain 15 is above the bottom 12 of container 10. The level of continuous water phase should not rise above drain 15 but can accumulate to that level on bottom 12. Depending on the column height of stored strands 18, accumulated liquid at the bottom 12 will ordinarily cause the column to float, with only a small portion of the filaments 18 completely submerged below liquid-level 13.

Figure 3:
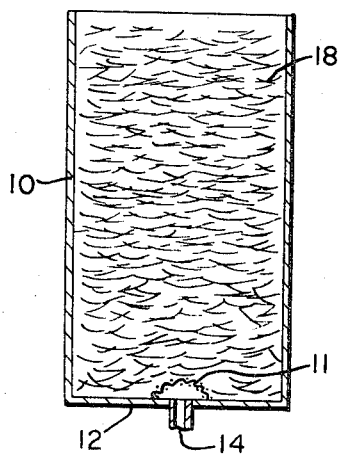
FIG. 3 is the storage vessel of FIG. 1 filled with dry cellular strands.
Figure 4:
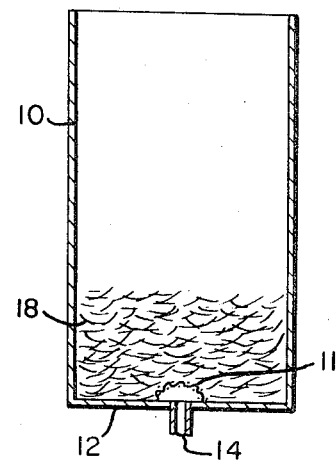
FIG. 4 is representative of the change in volume of cellular strands as shown in FIG. 3 after they have been thoroughly wetted with water.

FIGS. 3 and 4, taken together, show the typical extent of increase in packing efficiency and bulk density of strands 18 when water-wetted according to this invention. In FIG. 3 the container 10 is filled with dry strands 18 deposited without water-wetting. After water-wetting to create a thin film of water over most of the strand-surfaces, the same quantity of strands 18 occupies only a fraction of the volume of container 10, as shown in FIG. 4. Typically, the weight of cellular strands which can be held in a given container is increased by about three times when water-wetted as described herein.

The advantages of this invention are realized with substantially any low-density cellular polymeric strands regardless of whether the cells are open and interconnected or closed and gas-inflated. Likewise, it is immaterial whether the cellular strands are or are not enclosed within skins of dense polymeric material. When open-celled strands are employed, water is wicked into the strands making it difficult to remove when desired; and the increased weight of the column of stored strands can increase to the point of distorting or crushing strands at lower levels. This invention is particularly useful for the storage of closed-cell cellular strands. The volume of water as films on the strand-surfaces is small compared to the strand-volume, but the density differences are ordinarily so great that the weight of water film on each strand exceeds the weight of the strand, often by several times. It is this increased effective weight which causes improved packing efficiency and increased bulk-density.

Particularly preferred strands for use in this invention are closed-cell foamed polymeric structures exhibiting a dry density in the range from about 0.005 to about 0.05 gm./cc. They are elongated; i.e., the length of each strand exceeds its maximum transverse dimension, preferably by from about 20 to about 150 times. Cross-sectional areas of suitable cellular strands are ordinarily equivalent to those of circles with diameters from 0.01 to 1.0 inch (0.025 to 2.54 cm.), preferably 0.05 to 0.1 inch (0.127 to 0.254 cm.).

A wide variety of both addition and condensation polymers can form suitable cellular structures including, for example: polyolefins such as polyethylene and polypropylene; vinyl polymers such as polystyrene, polyvinyl chloride, and polyvinylidene fluoride; polyamides, both aliphatic and aromatic, such as polyhexamethylene adipamide and polymetaphenylene isophthalamide; polyurethanes, both aliphatic and aromatic, such as the polymer from ethylene bischloroformate and ethylene diamine; and polyesters such as polyhydroxypivalic acid and polyethylene terephthalate. Copolymers and mixtures of polymers can sometimes be used to advantage.

When water-wetted according to this invention, cellular strands occupy one-half or less of the bulk-volume of dry strands. This is solely an improvement in packing efficiency; i.e., at least for the preferred closed-cell gas-inflated cellular strands, the decreased volume results without collapse or distortion of the individual strands. Thus, on removal from storage and being dried, the strands retain their original cushioning or insulating properties.

While the primary advantage of this invention is an increase in bulk-density of stored cellular strands, it surprisingly also facilitates the removal from storage of the strands. It is well known that the application of large amounts of water to ordinary noncellular strands or fibers results in clumping, tangling, and reduction in fiber quality sufficient to require either drying and reopening or slurrying in excess of water before the fibers can be processed further. With cellular strands, however, water films on the surfaces decrease surface friction, eliminate static charge, and diminish clumping during removal from storage. Thus, in obtaining the advantages of this invention, one does precisely that which prior art and experience leads away from.

The following examples are illustrative of preferred embodiments of this invention, but, since many variations and substitutions are apparent without departing from the inventive concept, they are not intended as a limitation of the invention except as provided in the appended claims. Unless otherwise indicated, all parts and percentages are by weight.

EXAMPLE I

A supply of closed-cell, cellular, staple polyethylene terephthalate filaments was contained in a plurality of large bags. In order to construct cushioning structures from them, it was desirable that they be stored in a large container from which they could be continuously removed, i.e., in a container serving as feed hopper in a coupled process.

The staple filaments were obtained according to the teachings of U.S. Pat. No. 3,227,784, issued Jan. 4, 1966, to Blades and White. Example XV of that patent is representative of the process employed. The continuously extruded filaments were cut into staple lengths of 4 to 6 inches (10 to 15 cm.). Staple full inflation of the staple filaments resulted after (1) immersion for several minutes, e.g., 15, in a saturated solution of perfluorocyclobutane in methylene chloride at about −6° C., and (2) drying the staple for several minutes in moving air at about 100° C. This treatment fully inflated the filaments by providing within their closed cells a superatmospheric pressure contributed by air at substantially normal atmospheric pressure and by entrapped perfluorocyclobutane. These filaments were ultramicrocellular as fully disclosed by Blades and White in U.S. Pat. No. 3,227,664, issued Jan. 4, 1966. More specifically, the filaments exhibited densities from about 0.018 to about 0.030 gm./cc., were substantially round at a diameter of about 0.07 inch (1.8 mm.), and were comprised of closed polyhedralshaped cells with filmy cell-walls exhibiting uniform texture and uniplanar orientation (as defined in the above patent).

The storage container used was a generally boxlike, open-topped structure with a 3 by 4 foot (0.91 by 1.22 meter) rectangular cross section and an 8.6 foot (2.62 meter) height. One wall was bent outward near the bottom to provide an increasing cross section reaching its maximum at the bottom; and, of course, two other walls were slightly extended to enclose the sides. Total volume of the container was about 109 cubic feet (about 3.09 m.$^3$) of which the small side extension contributed about 6 cubic feet (about 0.17 m.$^3$). The bottom was closed to the passage of cellular filaments but open to the free draining of water.

The cellular filaments were removed by hand from their storage bags and dropped into the container through its open top until it was full. About 9.73 pounds (4415 gm.) of cellular filaments were added this way to provide an average bulk density of cellular filaments in the container of about 0.089 lb./ft.$^3$(1.430 kg./m.$^3$). The contents of the loosely filled container were packed down by hand while adding additional cellular filaments to keep it full. Total weight of the contents increased to 11.8 pounds (5358 gm.) to provide a slightly increased bulk density of 0.108 lb./ft.$^3$(1.730 kg./m.$^3$). Finally, water was sprayed over the contents to wet but not flood them, more cellular filaments being added while water spray continued until the container was again full. Total weight of contained filaments (exclusive of the weight of water retained as surface films) increased to 30.1 pounds (13,619 gm.) with a bulk density of 0.277 lb./ft.$^3$(4.440 kg./m.$^3$). When water-wet, the weight of cellular filaments contained was more than three times greater than the weight of loose dry filaments.

FIG. 5 represents apparatus suitable for removing the water-wet filaments 18 from the storage container 10 and recollecting them in the form of a random batt 20. This process is particularly effective because of: (1) the reduction of interfilament friction by water-wetting; (2) the substantial elimination of static electricity; and (3) the avoidance of bridging across the container 10 which frequently occurs with dry filaments. A large container 30 is filled with water to a level approximately indicated by line 31. This water level 31 effectively forms the bottom of container 10. A spiked belt 21 (power means for this and all other moving parts are not shown) moves continuously across the bottom of container 10 in the indicated direction and, in cooperation with spiked drum 22, transports filaments 18 from the bottom of container 10 to spiked apron 23. Spiked apron 23, moving as shown, draws filaments 18 down below surface 31 where stripper-roll 24 holds back excess filaments. The remaining filaments 18 are carried around the end of spiked apron 23 where, by the buoyant force of water, they float up to discharge screen 25 and become randomly distributed beneath it. Discharge screen 25 moves the collected filaments to the nip with conveyor screen 26, and screens 25 and 26 cooperate to lift the filaments above water level 31, across the end of container 30, and onto conveyor screen 27 for further processing. Uniformity of filament-distribution in random batt 20 is excellent. To obtain better uniformity of distribution, if required, two or more spiked aprons 23 in series can be employed.

EXAMPLE II

This example shows the bulk density of cellular strands, when water-wet, as a function of column height. The cellular filaments of EXAMPLE I were used. Tests were performed in a cylindrical "tower" 1 foot (0.3048 m.) in diameter and about 4 feet (1.2 m.) high. The top was open and the bottom was closed except for a water-drain. When loosely deposited in storage, the dry filaments were known to exhibit bulk densities in the range from about 0.08 lb./ft.3(1.28 kg./m.$^3$) up to 0.14 lb./ft.3(2.24 kg./m.$^3$), depending on column height. With 0.6 lb. (0.272 kg.) of cellular filament, the tower became almost full when simultaneously wetted with a known weight of water. By weighing excess water collected from the bottom drain, it was determined that each part of dry filament retained five parts of water as films on the filament surfaces. The packing effects of greater column heights were simulated by adding weights to the top of the column on a piston uniformly distributing the loads over the cross section of the tower.

TABLE I.—WATER-WET BULK DENSITY vs. COLUMN HEIGHT

| Added weight | | Column height | | Bulk density | | Theoretical total height | | Theoretical average bulk density | |
|---|---|---|---|---|---|---|---|---|---|
| Lb. | Kg. | In. | Cm. | Lb./ft.³ | Kg./m.³ | Ft. | M. | Lb./ft.³ | Kg./m.³ |
| 0 | 0 | 42.1 | (106.9) | 0.218 | (3.49) | | | | |
| 8.95 | (4.06) | 37.25 | (94.6) | 0.246 | (3.94) | 11.4 | (3.47) | 0.232 | (3.92) |
| 19.40 | (8.80) | 28.625 | (72.7) | 0.320 | (5.13) | 18.2 | (5.55) | 0.269 | (4.31) |
| 28.40 | (12.88) | 25.125 | (63.8) | 0.365 | (5.85) | 23.3 | (7.10) | 0.292 | (4.67) |
| 39.00 | (17.69) | 21.6875 | (55.1) | 0.422 | (6.76) | 28.3 | (8.63) | 0.320 | (5.13) |
| 48.00 | (21.8) | 20.375 | (51.8) | 0.451 | (7.23) | 32.8 | (10.0) | 0.334 | (5.36) |
| 58.50 | (26.5) | 18.375 | (46.7) | 0.499 | (8.00) | 36.8 | (11.22) | 0.358 | (5.75) |
| 67.50 | (30.6) | 17.8125 | (45.2) | 0.517 | (8.29) | 41.1 | (12.53) | 0.368 | (5.89) |
| 78.00 | (35.4) | 16.875 | (42.9) | 0.543 | (8.70) | 45.5 | (13.87) | 0.380 | (6.10) |
| 87.00 | (39.5) | 15.875 | (40.3) | 0.578 | (9.27) | 48.3 | (14.72) | 0.398 | (6.38) |
| 96.20 | (43.6) | 15.0 | (38.1) | 0.611 | (9.79) | 51.1 | (15.58) | 0.414 | (6.64) |
| 105.00 | (47.6) | 14.75 | (37.5) | 0.621 | (9.95) | 54.7 | (16.67) | 0.420 | (6.72) |

Table I presents the results obtained. Column 1 indicates the total weight added to the top of the tower. Column 2 shows the height of the column of filaments in the tower corresponding to the applied load. Column 3 presents the bulk density of the filaments based on their known dry weight and the computed volume occupied. Column 4 is the total height of a theoretical column of wet filaments, without additional weights at the top, which should provide the same bulk density observed. Column 5 presents the average bulk density of the theoretical column of filaments which has the filaments actually used at its bottom and enough identical wet filaments above to equal the force of the applied weights. It was assumed that any such theoretical column would have a bottom portion corresponding to the actual fibers used and a top portion identical to that represented by the top line of results for the unweighted column. Therefore, the average bulk densities, $\bar{\rho}$, were computed from Equation 1

$$\bar{\rho} = \frac{\rho + \rho_0}{2} \quad (1)$$

in which $\rho$ is the bulk density for each line of Column 3 and $\rho_0$ is the top bulk density of column 3. The theoretical total heights, H, of Column 4 were then obtained from Equation (2)

$$H = \frac{\frac{W}{6} + W_0}{A\bar{\rho}} \quad (2)$$

where W is the weight added to the top of the tower, $W_0$ is the dry weight of filaments place in the tower, A is the cross-sectional area of the tower, and $\bar{\rho}$ is the average bulk density of Column 5. Weight, W, was divided by 6 to obtain the equivalent weight of dry filaments. Plots of the bulk-densities of both Column 3 and Column 5 versus the corresponding theoretical total heights of Column 4 yielded straight lines over the whole range investigated. It is apparent that the packing efficiency of wet filaments improves as the height of the column increases and that, at a column height of about 50 ft. (15.24 mm.), the weight of water-wet filaments stored is at least 3, and as much as 4 or more, times the weight of dry filaments in the same volume. Furthermore, the filaments removed from the tower after storage under these conditions were substantially unchanged in size, shape, and density.

Further experiments identically conducted except for the use of larger applied weights indicated that the linear relationship between bulk density and theoretical total height extends to heights of at least 60 feet (18.3 meters) and that, at a height of about 100 feet (30.5 meters), a maximum bulk density in excess of 0.9 lb./ft.3(14 kg./m.³) was obtained without damage to the filaments.

I claim:

1. Method of storing low-density staple-length cellular polymeric strands in a storage container open to the atmosphere so as to increase their bulk density in storage and facilitate their removal from an opening in the lower portion of the storage container with substantially no clumping which comprises collecting the strands within the storage container and maintaining the surfaces of the strands wet with a liquid which is inert to and a nonsolvent for the strands.

2. Method of claim 1 wherein the liquid is water.

3. Method of claim 2 wherein the cells of the strands are closed and gas-inflated.

4. Method of claim 3 wherein the strands exhibit a dry density in the range of about 0.005 to about 0.05 gm./cc. and have cross-sectional areas equivalent to those of circles with diameters of 0.01 to 1.0 inch.

5. Method of claim 4 wherein the strands have cross-sectional areas equivalent to those of circles with diameters of 0.05 to 0.1 inch.

6. Method of claim 5 wherein the closed-cells of the strands are polyhedral-shaped with filmy cell-walls exhibiting uniform texture and uniplanar orientation.

7. Method of claim 6 wherein the water-wetted strands occupy less than one-half the bulk-volume of dry strands.

8. Method of claim 2 wherein the strands are sprayed with water as they are introduced into the storage container.

9. Method of claim 2 wherein the lower-end of the container is open and the container is mounted above a body of water whereby the surface of the water effectively forms the bottom of the container and the stands float on the surface of the water.